United States Patent [19]
Visser

[11] Patent Number: 5,851,606
[45] Date of Patent: Dec. 22, 1998

[54] THERMOFORMABLE ACRYLIC RESIN SHEET

[75] Inventor: Eli Visser, Leeuwarden, Netherlands

[73] Assignee: Atohaas holding C.V., Haarlem, Netherlands

[21] Appl. No.: 622,595

[22] Filed: Mar. 26, 1996

[30] Foreign Application Priority Data

Mar. 27, 1995 [EP] European Pat. Off. ............. 95200764

[51] Int. Cl.$^6$ ....................................................... B32B 5/16
[52] U.S. Cl. ................................ 428/15; 156/61; 428/327
[58] Field of Search ......................... 428/15, 327; 156/61

[56] References Cited

U.S. PATENT DOCUMENTS

| | | | |
|---|---|---|---|
| 4,113,803 | 9/1978 | Price | 526/261 X |
| 4,803,026 | 2/1989 | Ikeda et al. | 264/216 |
| 5,034,084 | 7/1991 | Schafer et al. | 428/15 X |
| 5,043,377 | 8/1991 | Nogi et al. | 524/437 |
| 5,242,968 | 9/1993 | Minghetti et al. | 524/430 |
| 5,308,425 | 5/1994 | Daff et al. | 156/231 |
| 5,415,931 | 5/1995 | Minghetti et al. | 428/327 |
| 5,418,048 | 5/1995 | Daff et al. | 428/15 |

FOREIGN PATENT DOCUMENTS

| | | |
|---|---|---|
| 7307660 | 12/1973 | Netherlands . |
| 8901276 | 1/1990 | Netherlands . |
| WO 90/01470 | 2/1990 | WIPO . |
| 0 362 884 A2 | 4/1990 | WIPO . |
| WO 92/03497 | 3/1992 | WIPO . |
| WO 94/08787 | 4/1994 | WIPO . |

OTHER PUBLICATIONS

Abstract of JP–A–01 236257, Derwent Publications.
Abstract of JP–A–03 182 558, Derwent Publications.

*Primary Examiner*—Henry F. Epstein
*Attorney, Agent, or Firm*—Hoffman & Baron, LLP

[57] ABSTRACT

The invention relates to a process for producing a thermoformable acrylic resin sheet having a granite-like appearance after thermoforming, wherein ground particles of a methyl methacrylate resin which has been slightly cross-linked by means of 0.005–0.2 wt. % of a polyfunctional monomer, said particles having a size smaller than 1 mm, are incorporated in an amount of 0.3–1.5 wt. % into a liquid methyl methacrylate matrix resin composition containing a cross-linking monomer in an amount which is sufficient for effecting cross-linking of the matrix resin to a degree which is equal to or higher than the degree of cross-linking of the ground resin particles, at least one of the resin particles and the matrix resin composition containing a coloring material providing a color difference between them, whereupon the liquid mixture is brought into a flat mold and is kept therein to allow the resin particles to settle and the mixture is then polymerized to produce the thermoformable acrylic resin sheet. The invention also relates to a thermoformable acrylic resin sheet and to shaped articles having a granite-like appearance.

18 Claims, No Drawings

THERMOFORMABLE ACRYLIC RESIN SHEET

The present invention relates to a process for producing a thermoformable acrylic resin sheet, wherein ground particles of a methyl methacrylate resin are incorporated into a liquid methyl methacrylate matrix resin composition, at least one of the resin particles and the matrix resin composition containing a coloring material providing a color difference between them, the liquid mixture is brought into a flat mold and is kept therein to allow the resin particles to settle and the mixture is then polymerized to produce the thermoformable acrylic resin sheet.

NL-A-8901276 discloses a process which is carried out along the lines described above. Colored ground particles of a methyl methacrylate (MMA) resin having a particle size below 5 mm and preferably below 3 mm are incorporated in an amount of 1–20 wt. % in a differently colored liquid MMA matrix resin composition, whereupon the mixture is poured out in a flat mould, the particles are allowed to settle and the mixture is polymerized. The ground particles are generally not cross-linked, although weak cross-linking of the matrix polymer may be advantageous. According to the Examples, uncross-linked ground resin particles of e.g. less than 3 mm are added to the liquid MMA matrix composition in an amount of about 4 wt. %, whereupon the sheet is produced as described above. It can be observed that the result of the procedure as described in NL-A-8901276, while using a rather large amount of uncross-linked ground particles, is that the ground particle areas are not sharply distinguished from the differently colored matrix areas and that the mechanical properties of the article produced by thermoforming of the resin sheet are deficient because of the presence of cracks, which will cause premature deterioration of the article.

It is an object of the present invention to provide a process for producing a thermoformable acrylic resin sheet which can be thermoformed into a shaped article having sharply defined differently colored areas embedded in a matrix resin resulting in a granite-like appearance.

According to another object of the present invention, a process is provided for producing a thermoformable acrylic resin sheet which can be thermoformed into a shaped article having a granite-like appearance and moreover having excellent mechanical strength properties and being devoid of cracks, which in turn results in a considerable lengthening of the life of the article.

A still further object of the present invention is to provide a process which is simple and reliable and is particularly suitable for use on an industrial scale.

A thermoformable acrylic resin sheet suitable for being thermoformed into a shaped article having a granite-like appearance as well as a shaped article having a granite-like appearance are still further objects of the present invention.

Still further objects and advantages of the present invention will appear from the detailed description and the example given hereinafter.

According to the present invention, specific conditions have been found which make it possible to achieve the objects mentioned above.

The process according to the invention for producing a thermoformable acrylic resin sheet having a granite-like appearance after thermoforming is characterized in that ground particles of a methyl methacrylate resin which has been slightly cross-linked by means of 0.005–0.2 wt. % of a polyfunctional monomer, said particles having a size smaller than 1 mm, are incorporated in an amount of 0.3–1.5 wt. % into a liquid methyl methacrylate matrix resin composition containing a cross-linking monomer in an amount which is sufficient for effecting cross-linking of the matrix resin to a degree which is equal to or higher than the degree of cross-linking of the ground resin particles, at least one of the resin particles and the matrix resin composition containing a coloring material providing a color difference between them, whereupon the liquid mixture is brought into a flat mold and is kept therein to allow the resin particles to settle and the mixture is then polymerized to produce the thermoformable acrylic resin sheet.

Preferably, first a prepolymer resin is prepared by partly polymerizing methyl methacrylate (MMA) in the presence of a small amount of a polymerization initiator and optionally also in the presence of a release agent, at elevated temperature and while stirring according to techniques which are generally known in the art. Then an additional amount of MMA is added, the mixture is cooled and is optionally already supplemented with the required additional amount of initiator for completing the polymerization later on, and with further additives such as an UV absorber. The conversion of the prepolymer thus obtained is generally between 0.06 and 0.1 and the prepolymer syrup has a viscosity between 100 and 500 mPa.s, preferably between 200 and 400 mpa.s.

The polymerization initiator can be selected from the compounds generally known in the art, such as azo and peroxy compounds. Specific examples of such compounds are azobisisobutyronitrile, azobisdimethylvaleronitrile, azobiscyclohexanenitrile, benzoyl peroxide, lauroyl peroxide, acetyl peroxide, isobutyl peroxide, t-butyl peroxypivalate, isopropyl peroxydicarbonate, sec-butyl peroxydicarbonate, n-butyl peroxydicarbonate and t-amylperoxy-2-ethylhexanoate. The initiator is added in an amount sufficient for effecting the desired conversion of the MMA, usually in an amount of 0.002 to 0.01 parts per hundred, based on the weight of the MMA (it will be evident that the weight of the MMA prepolymer is included).

Fatty acids and fatty acid esters such as stearic acid and dioctyl sodium sulfosuccinate can be mentioned as examples of release agents which make it easier to remove the thermoformable resin sheet from the flat mold and which further facilitate the thermoforming of the resin sheet. The release agent can be added in an amount of 0.02 to 0.1 part per hundred, based on the weight of the MMA.

For manufacturing the ground particles, there are added to the prepolymer an additional amount of an initiator, i.e. an amount sufficient to complete the polymerization, e.g. an amount which is 10–20 times the amount of initiator used in preparing the prepolymer (it is observed that this additional amount of initiator can already have been added before, as discussed above), a polyfunctional cross-linking monomer and preferably also a coloring material such as a pigment paste. In case a pigment paste is added, a homogeneous distribution thereof in the prepolymer can be facilitated by also including a suitable pigment dispersing agent. A further preferred additive is a chain transfer agent which controls and shortens the chain length at the polymerization stage and thereby improves the flexibility when the resin sheet is thermoformed, thus contributing to preventing the formation of cracks or fissures. There can also be added a comonomer in an amount of at most 10 wt. % calculated on the total weight of MMA and comonomer. It has been observed that the presence of a comonomer can have a favorable effect in retarding undesirable depolymerization when the resin sheet is thermoformed. The term methyl methacrylate (MMA) as used herein is intended to also include such copolymers having at most 10 wt. % of comonomer. Examples of suitable comonomers are methacrylic acid, alkyl acrylates, alkyl methacrylates other than MAA, styrene and α-methylstyrene. Further optional additives are e.g. antioxidants and light and UV absorbing agents, although the presence of these absorbing additives is less necessary in view of the fact that the resin sheet is generally rather highly colored.

The polyfunctional cross-linking monomer is an essential component in preparing the ground particles. As a matter of fact, a slight cross-linking of the ground particles is necessary, because without cross-linking the particles will partly dissolve in the liquid matrix resin composition and thereby the granite-like appearance aimed at cannot be obtained in that the sharp edges of the ground particles will be lost. To put it differently, the ground particles will then partly diffuse into the matrix material, with the result that the color of the ground particles will fade into the color of the matrix resin. Conversely, a too high degree of cross-linking has an unfavorable effect on the good and lasting cohesion between the ground particles and the matrix resin and will give rise to the occurrence of cracks.

Therefore, it has been found that an amount of 0.005–0.2 wt. % of a polyfunctional cross-linking monomer, calculated on the MMA, will ensure an optimal slight cross-linking resulting at the same time in the desired granite-like appearance and in a bonding with the matrix resin which is strong enough to resist stress cracking during thermoforming of the resin sheet. Actually, the amount of 0.005–0.2 wt. % is the amount employed in case a preferred cross-linking monomer, viz. 1,4-butanediol dimethacrylate, is used for effecting the slight cross-linking needed. It is evident that other cross-linking monomers can be used in equivalent amounts. Examples of other suitable cross-linking monomers include 1,2-ethanediol dimethacrylate, diethylene glycol dimethacrylate, triethylene glycol dimethacrylate, triallylcyanurate, allylacrylate, vinylacrylate, divinylbenzene, triallylphosphate, diallylmaleate and methallylacrylate.

The coloring material is preferably added to the prepolymer as a pigment paste comprising a plasticizer, e.g. dioctyl phthalate and/or diisooctyl phthalate, and a selected pigment homogeneously dispersed therein. The pigment paste is usually added in an amount of 0.1–5 wt. %, calculated on the MMA, the specific amount to be used depending on the pigment concentration in the paste and on the desired color intensity. Examples of white pigments are titanium dioxide, zinc sulfide, calcium carbonate, calcium sulfate, barium sulfate, talc, kaolin and mixtures thereof. Different types of carbon black can be used as black pigment. Examples of pigments having a different color are ultramarine, cobalt and iron pigments as well as phthalocyanine pigments and phthalocyanine copper complexes. Although it is not necessary to add a coloring material to the prepolymer for preparing the ground particles, in case a coloring material is in fact incorporated into the matrix resin, in practice coloring materials providing desired different colors are added to the prepolymer for preparing the ground particles and to the liquid matrix resin composition as well. In order to facilitate the dispersion of the pigment paste into the prepolymer for preparing the ground particles, a pigment dispersing agent such as a cellulose ester, e.g. cellulose acetate butyrate, can be added, preferably in a weight ratio to the pigment paste in the range of ⅓ to ¼.

For the reason already mentioned above, a chain transfer agent is a further preferred ingredient to be incorporated into the prepolymer for producing the ground particles. Chain transfer agents are well known in the art of polymer chemistry. Examples of suitable chain transfer agents are alkyl and aryl mercaptans such as octyl mercaptan, lauryl mercaptan and n-, s- and t-dodecyl mercaptan, glycol dimercaptoacetate, isooctylthioglycolate, triphenylmethane, trichloromethane, tetrachloromethane, methallylchloride, 1,4-cyclohexadiene, limonene, terpinolene and terpinenes. Terpinenes and in particular γ-terpinene have been found to be most preferable for use according to the invention. The amount of chain transfer agent used is generally below 0.06 wt. %, calculated on MMA. The optimum amount to be used depends on the intended use of the resin sheet and more particularly on the degree of deformation at the thermoforming stage. As a rule, more chain transfer agent and less cross-linking monomer will be used when the resin sheet will be subjected to a heavy deformation for producing an article of rather complicated shape.

Finally, antioxidants, light absorbing agents and/or UV absorbing agents can be added according to need. Sterically hindered amines such as di-(2,2,6,6-tetramethylpiperidyl-4) -sebacate are suitable light absorbing agents and 2-(2'-hydroxy-5'-methylphenyl)-benzotriazole and 2-hydroxy-4-octyloxybenzophenone are examples of suitable UV absorbing agents.

The prepolymer mixture containing the additional ingredients referred to above is thoroughly stirred to obtain a homogeneous mixture which is then brought into a flat mold having the desired size, e.g. about 2×3 meters, and is polymerized as is usual in the art, e.g. first at a rather low temperature of e.g. about 70° C. and then for a longer time at a higher temperature of e.g. about 120° C. After polymerization has been completed the sheet is cooled and is cut or broken into small pieces which are further crushed and ground in a suitable grinding device such as a ball mill, a hammer mill, etc. In view of the granite-like appearance aimed at it is desirable to ensure the particles are ground in such a way that they possess at least a substantial part of sharp edges. The grinding is continued until the particles are small enough for use according to the invention. As a matter of fact, the size of the particles used should be smaller than 1 mm and preferably even smaller than 0.6 mm. If need be, particles having a larger size than the maximum size of 1 mm or than the desired maximum size of 0.6 mm can be removed by sieving them off. The maximum size of the particles is very important because it has been found that particles having a size above 1 mm have an adverse effect on the strength and more particularly cause cracks and fissures in the shaped article obtained by thermoforming, thereby considerably shortening the life of the shaped article.

To produce the thermoformable acrylic resin sheet, one can start from a prepolymer which has been prepared as described above. The additional amount of polymerization initiator needed for the further polymerization is added—if it has not yet already been added before, as discussed above. Further components can then be added in the same amounts and for the same purposes as described above for preparing the ground particles. This applies to the use of a polyfunctional cross-linking monomer, a coloring material, a chain transfer agent and the presence of comonomers in an amount of at most 10 wt. %. However, there are a few points to be taken into account, as will be discussed hereinafter.

First, the amount of the cross-linking monomer should be at least equal to the amount used in preparing the ground particles. Preferably, however, the amount chosen is slightly higher, e.g. between 50 and 150 wt. % more than the amount used for the ground particles. This is important to obtain the proper balance of the mechanical properties of the thermoformable resin sheet.

Secondly, it is still more important to use a chain transfer agent in the matrix resin composition than has been described before with respect to the preparation of the ground particles, because the matrix resin should be highly resistant to the heavy forces occurring at the thermoforming stage.

Finally, it is preferred to omit the use of a dispersing agent for the coloring material, in particular also for a pigment paste which is optionally used, because such a dispersing agent tends to keep the ground particles dispersed throughout the liquid composition and delays the settlement thereof in the lower part of the resin sheet to be formed.

The ground particles having a particle size as specified above are added to the liquid matrix resin composition as described in an amount of 0.3–1.5 wt. % and preferably of between 0.8 and less than 1.0 wt. %. A larger amount than 1.5 wt. % makes it difficult to adequately handle the liquid composition and, moreover, diminishes the mechanical strength of the shaped article. The ground particles are thoroughly mixed with the liquid composition, whereafter the mixture is brought into a flat mold, where the particles settle and are concentrated mainly in the lower part, due to the difference in specific gravity between the particles, which amounts to about 1.20, and the liquid composition, which is generally between 0.95 and 1.10. The time needed for the settlement is further influenced by the viscosity of the liquid composition and by the desired absence of a dispersing agent for the coloring material. The liquid composition causes a slight swelling of the ground particles, which in turn results in a strong cohesion between the particles and the matrix material and considerably improves strength properties of the resin sheet and the shaped articles produced therefrom. The settlement of the ground particles is generally allowed to continue until at least 70 wt. % and preferably at least 80 wt. % of the particles have sunk in the lower 50% part of the resin sheet, which is preferably produced in a thickness of between 3 and 6 mm. Then the product is polymerized according to usual procedures as known in the art, for example first at a rather low temperature of e.g. about 70° C., and then at a higher temperature of e.g. about 120° C.

It can be summarized that a combination of features comprising the small size of the ground particles, the low concentration of these particles in the resin sheet and the requirements with respect to the cross-linking of the particles and the matrix resin respectively, as discussed hereinabove, are of crucial importance for obtaining the objects of the invention and the favorable effects reported herein. The use of a chain transfer agent contributes to a further improvement of the flexibility at the stage of thermoforming the resin sheet.

The thermoformable resin sheet thus obtained is a commercial product which is intended for being thermoformed into a shaped article, e.g. a sanitary article such as a bath-tub, a wash-stand etc., a kitchen-sink or any other shaped articles or accessories having a nice granite-like appearance. The thermoformation can take place by heating the resin sheet until the softening range has been reached and applying a vacuum in a mold having the desired shape so that the sheet will become thermoformed into the shape of the mold. This technique is generally known in the art and needs no further explanation. By the thermoformation the thickness of the resin is generally reduced from about 3–6 mm to about 1–4 mm. In order to increase the overall strength of the shaped article a reinforcing web such as a glass fiber web can be coated onto the surface of the article which is opposite to the surface having the granite-like appearance.

The shaped article thus obtained has a splendid granite-like appearance and moreover has a smooth and glossy surface without cracks or fissures. The article has a good resistance to mechanical impact and chemical attack and is well suited for prolonged use.

The invention will be illustrated by the following example.

EXAMPLE

1. Manufacture of the Prepolymer Resin

A reaction vessel equipped with a mixer of the propellor type, a cooling jacket (water of 5°–10° C.) and a heating jacket (saturated steam of 100° C.) is loaded with:

| | |
|---|---|
| methyl methacrylate MMA (10° C.) | 600 kg |
| azobisisobutyronitrile (AIBN) (initiator) | 60 g |
| stearic acid (release agent) | 600 g |

The reactor content is heated under moderate stirring. When the temperature has reached a value of 80° C. the steam valve is closed. The reaction is exothermic. However, by using cooling water the temperature is maintained at 85°–90° C. for one hour.

Under accelerated stirring, an additional amount of 600 kg MMA (5°–10° C.) is added and then the reactor content is cooled to 35°–40° C. Finally, 900 g AIBN and 360 g Tinuvin P (UV absorbing agent; Ciba-Geigy) are added. The prepolymer resin thus obtained has a conversion value of 0.08 and a viscosity of about 300 mPa.s.

2. Manufacture of the Ground Colored Acrylic Resin Particles

The following components are added to 100 kg of the prepolymer resin obtained as described sub 1:

| | |
|---|---|
| γ-terpinene (chain transfer agent CTA) | 40 g |
| 1,4-butanediol dimethacrylate BDMA (cross-linking agent CLA) | 30 g |
| cellulose acetate butyrate CAB (pigment dispersion agent) | 1000 g |
| black color paste master batch (65% carbon black in a plasticizer mix) | 1500 g |

The mixture is stirred thoroughly in a mixing vessel and poured out into a flat glass mold of 2000×3000 mm. The polymerization is carried out in a water bath at 70° C. for 3 hours and then in an air oven at 120° C. for 2.5 hours. After having been cooled the resin sheet is broken to pieces, ground and sieved in order to remove the particles having a size above 500 μm.

3. Preparation of the Matrix Resin Composition And Manufacture of the Sheets

The following components are added to 100 kg of the prepolymer resin obtained as described sub 1:

| | |
|---|---|
| methacrylic acid (comonomer) | 20 g |
| γ-terpinene (CTA) | 40 g |
| BDMA (CLA) | 60 g |
| color paste master batch (titanium dioxide in a plasticizer mix) | 1500 g |

The mixture is stirred thoroughly, whereupon 0.90 kg of the colored ground particles obtained as described sub 2 are added to 100 kg of the matrix resin composition and are mixed therewith under accelerated speed for 15 minutes. Then the mixture is de-aerated and transported into a flat glass mold of 2000×3000 mm. After a rest time of 40 minutes in order to permit the particles to settle and to absorb the matrix resin, the mixture is polymerized for 3 hours in a water bath at 70° C. and then in an air oven at 120° C. for 2.5 hours. After having been cooled the resin sheet is taken from the mold and is ready for use. The sheet thickness is about 6 mm.

4. Manufacture of a Shaped Article

The resin sheet produced sub 3 is heated until it becomes slightly plastic. Then a mold of a bath-tub is placed onto the sheet and a vacuum is applied according to techniques which are generally known in the art. Depending on the degree of softening in combination with the vacuum attained, the sheet is at once thermoformed into a bath-tub. The sheet thickness has been reduced to about 3 mm. Finally, a mixture of glass fibres and liquid polyester resin is sprayed onto the outer surface of the bath-tub in order to reinforce the overall strength of the shaped article.

The shaped article thus obtained has a splendid granite-like appearance and moreover has a smooth and glossy surface without cracks or fissures. The article has a good resistance to mechanical impact and chemical attack and is well suited for prolonged use.

I claim:

1. A process for producing a thermoformable acrylic resin sheet having a granitic appearance and smooth surface after thermoforming, which comprises: mixing 0.3–1.5 wt. % of ground particles of a methyl methacrylate resin having a size smaller than 1 mm, the methyl methacrylate resin being slightly cross-linked with 0.005–0.2 wt. % of a polyfunctional monomer, with a liquid methyl methacrylate matrix resin composition containing a sufficient amount of a cross-linking monomer for effecting cross-linking of the matrix resin to a degree equal to or higher than the degree of cross-linking of the ground resin particles, and wherein at least one of the resin particles or the matrix resin composition contains a coloring material to provide a color difference between them; transporting the mixture to a flat mold, wherein the mixture is kept therein for a sufficient amount of time to allow the resin particles to settle; and polymerizing the mixture in the mold to produce the thermoformable acrylic resin sheet.

2. A process according to claim 1, wherein the methyl methacrylate resin of the ground particles has been cross-linked by means of 0.01–0.05 wt. % 1,4-butanediol dimethacrylate or an equivalent amount of another cross-linking monomer.

3. A process according to claim 1, wherein the ground resin particles have a particle size smaller than 0.6 mm.

4. A process according to claim 1, wherein the ground resin particles are mixed with the liquid matrix resin composition in an amount between 0.8 and less than 1.0 wt. %.

5. A process according to claim 1, wherein a chain transfer agent is added to the liquid matrix resin composition in an amount of at most 0.05 wt. %.

6. A process according to claim 5, wherein the chain transfer agent is a terpinene and preferably γ-terpinene.

7. A process according to claim 1, wherein the liquid matrix resin composition has a viscosity of 1–5 Poise.

8. A process according to claim 1, wherein the liquid matrix resin composition has a specific gravity between 0.95 and 1.10.

9. A process according to claim 1, wherein the liquid matrix resin composition is substantially free from a dispersant for the ground resin particles.

10. A process according to claim 1, wherein the methyl methacrylate resin of the ground particles and/or the methyl methacrylate resin of the matrix resin is a copolymer or are copolymers having at most 10 wt. % of comonomeric units.

11. A process according to claim 1, wherein the thermoformable acrylic resin sheet is produced in a thickness between 3 and 6 mm.

12. A process according to claim 1, wherein the mixture is kept in the mold for a sufficient amount of time to allow at least 70 wt. % of the particles to settle to the lower half of the resin sheet.

13. A thermoformable acrylic resin sheet suitable for thermoforming into a shaped article having a granitic appearance and smooth surface, the sheet comprising a polymerized, cross-linked methyl methacrylate matrix resin having embedded therein near one surface of the sheet 0.3–1.5 wt. % of ground resin particles of a methyl methacrylate resin having a size smaller than 1 mm, the particles being slightly cross-linked with 0.005–0.2 wt. % of a polyfunctional monomer, wherein the matrix resin is cross-linked to a degree equal to or higher than the degree of cross-linking of the resin particles, and wherein at least one of the resin particles or the matrix resin contains a coloring material to provide a color difference between them.

14. A shaped article having a granitic appearance and smooth surface formed from the acrylic resin sheet of claim 13, wherein the surface of the article opposite to the surface having the granitic appearance has an adherent reinforcing web.

15. A shaped article according to claim 14, wherein the article is thermoformed as a sanitary article chosen from the group consisting of bath-tub, wash-stand and kitchen sink.

16. An acrylic resin sheet according to claim 13, wherein at least 70% of the resin particles are embedded in half of said resin sheet.

17. A shaped article having a granitic appearance and smooth surface formed from a thermoformable acrylic resin sheet which comprises 0.3–1.5 wt % of ground particles of a methyl methacrylate resin having a size smaller than 1 mm, the methyl methacrylate resin being slightly cross-linked with 0.005–0.2 wt % of a polyfunctional monomer; and a liquid methyl methacrylate matrix resin composition containing a sufficient amount of a cross-linking monomer for effecting cross-linking of the matrix resin to a degree equal to or higher than the degree of cross-linking of the ground resin particles, wherein at least one of the resin particles or the matrix resin composition contains a coloring material to provide a color difference between them, and wherein at least 70% of the resin particles are embedded in half of said resin sheet, and wherein the surface of the article opposite to the surface having the granitic appearance has an adherent reinforcing web.

18. A shaped article according to claim 17, wherein the article is thermoformed as a sanitary article chosen from the group consisting of bath-tub, wash-stand and kitchen sink.

* * * * *

UNITED STATES PATENT AND TRADEMARK OFFICE
CERTIFICATE OF CORRECTION

PATENT NO. : 5,851,606
DATED : December 22, 1998
INVENTOR(S) : Eli Visser

It is certified that error appears in the above-identified patent and that said Letters Patent is hereby corrected as shown below:

In Column 2, Line 25,  delete "mpa.s" and insert therefor --mPa.s.--.

Signed and Sealed this

Thirtieth Day of March, 1999

Attest:

Q. TODD DICKINSON

*Attesting Officer*  *Acting Commissioner of Patents and Trademarks*